United States Patent
Yang et al.

(10) Patent No.: US 11,309,766 B2
(45) Date of Patent: Apr. 19, 2022

(54) COOLING JACKET WITH COOLANT MASS BALANCING FOR ELECTRIC MOTORS

(71) Applicant: GM GLOBAL TECHNOLOGY OPERATIONS LLC, Detroit, MI (US)

(72) Inventors: Xiaofeng Yang, Troy, MI (US); Wei Zeng, Oakland Township, MI (US); Lei Hao, Troy, MI (US); Srihari K. Gangaraj, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 304 days.

(21) Appl. No.: 16/736,185

(22) Filed: Jan. 7, 2020

(65) Prior Publication Data

US 2021/0211012 A1 Jul. 8, 2021

(51) Int. Cl.
*H02K 5/20* (2006.01)
*H02K 15/03* (2006.01)
*H02K 9/00* (2006.01)

(52) U.S. Cl.
CPC ............. *H02K 5/20* (2013.01); *H02K 9/00* (2013.01); *H02K 15/03* (2013.01)

(58) Field of Classification Search
CPC ............. H02K 5/20; H02K 9/00; H02K 15/03
USPC ............................................... 310/59, 58, 61
See application file for complete search history.

(56) References Cited

U.S. PATENT DOCUMENTS

| | | | |
|---|---|---|---|
| 7,156,195 B2 * | 1/2007 | Yamagishi | F16H 57/0476 180/65.1 |
| 8,653,704 B2 * | 2/2014 | Atarashi | B60K 6/405 310/54 |
| 2014/0077631 A1 * | 3/2014 | Watanabe | H02K 9/193 310/54 |

FOREIGN PATENT DOCUMENTS

| | | | | |
|---|---|---|---|---|
| JP | 2011254580 A | * | 12/2011 | |
| KR | 101246337 B1 | * | 3/2013 | |
| WO | WO-2011132784 A1 | * | 10/2011 | ............. H02K 7/086 |

* cited by examiner

Primary Examiner — Jose A Gonzalez Quinones
(74) Attorney, Agent, or Firm — Vivacqua Crane PLLC

(57) ABSTRACT

A permanent magnet electric motor includes a shaft extending along a longitudinal axis and a rotor mounted on the shaft. The rotor is rotatable concomitantly with the shaft about the longitudinal axis, the rotor defines an innermost rotor edge. The innermost rotor edge is sized to receive the shaft. The permanent magnet electric motor further includes a stator. The shaft defines a jacket configured to receive a coolant. The jacket is disposed about the longitudinal axis. The jacket is elongated in a first direction. The first direction is parallel to the longitudinal axis. The rotor defines a plurality of longitudinal channels. Each of the plurality of longitudinal channel is elongated along the first direction, and each of the plurality of longitudinal channels is in fluid communication with the jacket to allow fluid flow between the jacket and the plurality of the longitudinal channels.

19 Claims, 4 Drawing Sheets

COOLING JACKET WITH COOLANT MASS BALANCING FOR ELECTRIC MOTORS

INTRODUCTION

The present disclosure relates generally to electric motors and, more particularly, to a cooling jacket with coolant mass balancing for electric motors.

High-speed electric motors may experience high temperatures in their rotors. Therefore, it is desirable to cool the rotors of high-speed electric motors. Current cooling methods, such as injecting coolant onto an end ring of the electric motor, result in the coolant being blown away. As a result, the coolant is not spread effectively on the end ring of the electric motor, resulting in ineffective heat transfer between the coolant and the electric motor.

SUMMARY

It is therefore desirable to develop a way to cool the rotor temperature while achieving coolant mass dynamic balance. The present disclosure describes a way to decrease the rotor temperature of an electric motor by flowing coolant into the shaft, into the rotor, and then back into the shaft. To do so, flow splitters, a rotor jacket, and interconnected channels are integrated in the electric motor, thereby minimizing mass in the electric motor and minimizing heat in the rotor. The flow splitters are located in the shaft channel to guide the coolant from the shaft channel into the rotor jacket channels, and then back into the shaft channels. In the present disclosure, the term "flow splitter" means a structure used to divide flow into two or more parts and divert these parts to different places. The rotor further defines interconnected channels to connect the rotor jacket channels, thereby achieving coolant mass dynamic balance.

The present disclosure describes the optimal choice of parameters and structures for a cooling jacket enclosed in rotor lamination, by flowing coolant into the shaft, into the rotor, then back into the shaft. These parameters and structures achieve the optimal dynamic balance of heat and mass for the electric motor by greatly increasing the convective surface area. As a result, temperature of permanent magnet significantly reduces. Further, mass of the rotor is decreased due to the jacket of rotor. The permanent motor further includes a plurality of flow splitters located in the jacket of the shaft to guide the coolant into the jacket of the shaft, into the longitudinal channels of the rotor, and then back the jacket of the shaft.

In an aspect of the present disclosure, a permanent magnet electric motor includes a shaft extending along a longitudinal axis and a rotor mounted on the shaft. The rotor is rotatable concomitantly with the shaft about the longitudinal axis, and the rotor defines an innermost rotor edge. The innermost rotor edge is sized to receive the shaft. The permanent magnet electric motor further includes a stator electromagnetically coupled to the rotor, wherein the stator is disposed around the rotor and remains stationary relative to the rotor. The shaft defines a jacket configured to receive a coolant. The jacket is disposed about the longitudinal axis. The jacket is elongated in a first direction. The first direction is parallel to the longitudinal axis. The rotor defines a plurality of longitudinal channels. Each of the plurality of longitudinal channels is elongated along the first direction, and each of the plurality of longitudinal channels is in fluid communication with the jacket to allow fluid flow between the jacket and the plurality of the longitudinal channels.

The rotor defines a plurality of interconnection channels, each of the plurality of interconnection channels directly interconnects an adjacent pair of the plurality of longitudinal channels to direct the coolant from one of the plurality of longitudinal channels to another one of the plurality of the longitudinal channels. The jacket is entirely disposed inside the shaft. Each of the plurality of longitudinal channels is entirely disposed inside the rotor, and each of the plurality of interconnection channels is entirely disposed inside the rotor.

In an aspect of the present disclosure, the permanent magnet electric motor further includes a first end ring and a second end ring opposite the first end ring. The rotor includes a first rotor end and a second rotor end opposite to the first rotor end. The first rotor end is spaced apart from the second rotor end along the first direction. The first end ring is attached to the rotor at the first rotor end. The second end ring is attached to the rotor at the second rotor end. The first end ring defines a first end channel. The second end ring defines a second end channel. The first end channel has an annular shape. The first end channel is in fluid communication with the plurality of longitudinal channels. The second end channel has an annular shape, and the second end channel is in fluid communication with the plurality of longitudinal channels.

In an aspect of the present disclosure, the permanent magnet electric motor further includes a plurality of pole pieces. Each of the plurality of longitudinal channels has a first lateral end and a second lateral end opposite the first lateral end. Each of the plurality of longitudinal channels is shaped as an arc extending from the first lateral end to the second lateral end. Each of the plurality of longitudinal channels has a central angle. The central angle of each of the plurality of longitudinal channels is subtended by the arc extending from the first lateral end to the second lateral end. The central angle of each of the plurality of longitudinal channels is less than $$\frac{360°}{M} \times 0.95$$

degrees, and M is the number of polar pieces.

In an aspect of the present disclosure, the rotor has a center, the rotor has an innermost rotor radius, the innermost rotor radius is defined from the center of the rotor to the innermost rotor edge, each of the plurality of longitudinal channels defines an innermost longitudinal-channel end and an outermost longitudinal-channel end opposite the innermost longitudinal-channel end, the outermost longitudinal-channel end of each of the plurality of longitudinal channels is farther from the center of the rotor than the innermost longitudinal-channel end of each of the plurality of longitudinal channels, each of the plurality of longitudinal channels defines an innermost longitudinal-channel radius and an outermost longitudinal-channel radius, the innermost longitudinal-channel radius is defined from the center of the rotor to the innermost longitudinal-channel end. The innermost longitudinal-channel radius is equal to or greater than: r+5 millimeters, where r is the innermost rotor radius in millimeters.

In an aspect of the present disclosure, the rotor defines an outermost rotor edge, the outermost rotor edge is opposite to the innermost rotor edge, the outermost rotor edge is farther from the center of the rotor than the innermost rotor edge, the rotor has an outermost rotor radius, the outermost rotor radius is defined from the center of the rotor to the outermost rotor edge of the rotor, each of the plurality of longitudinal channels defines an outermost longitudinal-channel radius, the outermost longitudinal-channel radius is defined from the center of the rotor to the outermost longitudinal-channel end of each of the plurality of longitudinal channels, and the outermost longitudinal-channel radius is equal to or less than: R−10 millimeters; and where R is the outermost rotor radius in millimeters.

In an aspect of the present disclosure, each of the plurality of longitudinal channels has a longitudinal-channel midpoint between the first lateral end and the second lateral end, a first longitudinal-channel distance from the first lateral end to the longitudinal-channel midpoint is equal to a second longitudinal-channel distance from the second lateral end to the longitudinal-channel midpoint, each of the plurality of interconnection channels has an interconnection-channel midpoint, each of the plurality of interconnection channels includes a first side-end and a second side-end opposite the first side-end, a first interconnection-channel distance from the first side-end to the interconnection-channel midpoint is equal to a second interconnection-channel distance from the second side-end to the interconnection-channel midpoint, each of the plurality of interconnection channels is shaped as an arc extending from the first side-end to the second side-end, each of the plurality of interconnection channels is angularly offset from an adjacent one of the plurality of longitudinal channels by an offset angle, the offset angle is defined from the longitudinal-channel midpoint of one of the plurality of longitudinal channels to the interconnection-channel midpoint of the adjacent one of the plurality of interconnection channels, and the offset angle is equal to:

$$\frac{360°}{M} \times 0.5,$$

where M is the number of polar pieces.

In an aspect of the present disclosure, the rotor defines a plurality of permanent-magnet slots, each of the plurality of permanent-magnet slots is sized to receive a permanent magnet, each of the plurality of permanent-magnet slots has an innermost slot point, the innermost slot point is disposed at a location of each of the permanent-magnet slot that is closest to the center of the rotor, and a distance from the outermost longitudinal-channel end to the innermost slot point is greater than 3 millimeters.

In an aspect of the present disclosure, each of the plurality of interconnection channels defines an innermost interconnection-channel end and an outermost interconnection-channel end that is opposite the innermost interconnection-channel end, the outermost interconnection-channel end of each of the plurality of interconnection channels is farther from the center of the rotor than the innermost interconnection-channel end of each of the plurality of interconnection channels, each of the plurality of interconnection channels defines an innermost interconnection-channel radius and an outermost interconnection-channel radius, the innermost interconnection-channel radius is defined from the center of the rotor to the innermost interconnection-channel end, the innermost interconnection-channel radius is equal to or greater than: r+5 millimeters, where r is the innermost rotor radius in millimeters.

In an aspect of the present disclosure, each of the plurality of interconnection channels defines an outermost interconnection-channel radius, the outermost interconnection-channel radius is defined from the center of the rotor to the outermost interconnection-channel end of each of the plurality of interconnection channels, and the outermost longitudinal-channel radius is equal to or less than: R−10 millimeters, where R is the outermost rotor radius in millimeters.

In an aspect of the present disclosure, each of the plurality of interconnection channels is shaped as an arc extending from the first side-end to the second side-end, each of the plurality of interconnection channels has a central angle, the central angle of each of the plurality of interconnection channels is subtended by the arc extending from the first side-end to the second side-end, and the central angle of each of the plurality of interconnection channels is less than $$\frac{360°}{M} \times 0.95$$

degrees, and M is a number of polar pieces.

In an aspect of the present disclosure, the permanent magnet electric motor includes a plurality of inlets fluidly interconnecting the jacket of the shaft to the plurality of longitudinal channels of the rotor, the first end channel is directly connected to all of the plurality of inlets, at least one of the plurality of inlets is directly connected to one of the plurality of longitudinal channels to allow the coolant to flow from the first end channel to the plurality of longitudinal channels through the plurality of inlets.

In an aspect of the present disclosure, the plurality of inlets includes between four and twelve inlets, and each of the plurality of inlets has an inlet diameter, and the inlet diameter is between three and five millimeters.

The permanent magnet electric motor further includes a plurality of outlets fluidly interconnecting the jacket of the shaft to the plurality of longitudinal channels of the rotor. The plurality of outlets is spaced apart from the plurality of inlets along the first direction. The second end channel is directly connected to all of the plurality of outlets. At least one of the plurality of outlets is directly connected to one of the plurality of longitudinal channels to allow the coolant to flow from the longitudinal channels to the second end channel through the plurality of outlets.

BRIEF DESCRIPTION OF THE DRAWINGS

The present disclosure will be described in conjunction with the following figures, wherein like numerals denote like elements.

Figure 1:
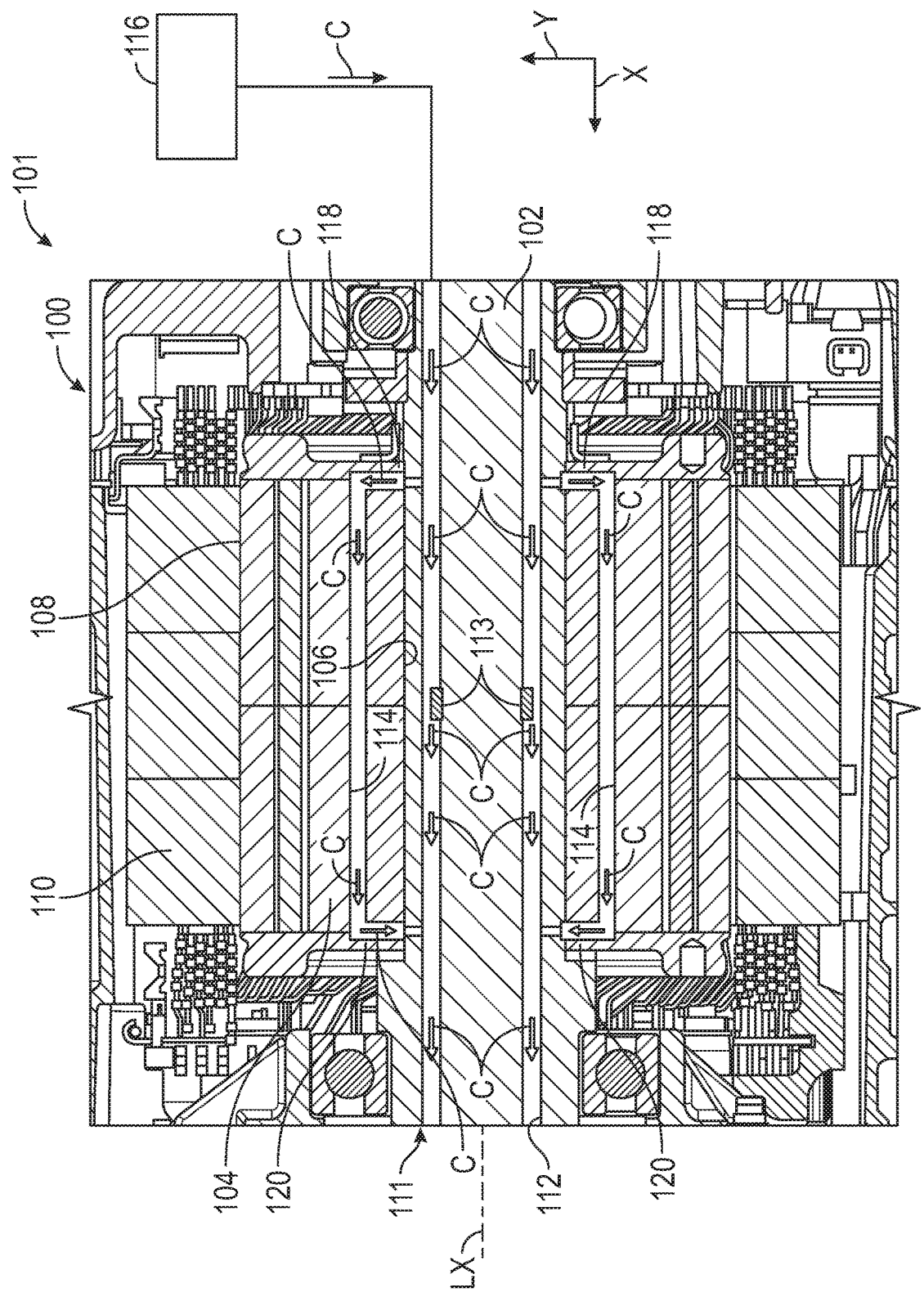
FIG. 1 schematically illustrates a cross-section of a permanent magnet electric motor in accordance with an aspect of the present disclosure.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary flame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import. Throughout the disclosure, like or similar reference numbers refer to like or similar components.

FIG. 1 shows a schematic cross-sectional view of a permanent magnet electric motor 100 configured to convert mechanical energy into electricity and vice-versa. The electric motor 100 includes a shaft 102 extending along a longitudinal axis LX. The electric motor 100 further includes a rotor 104 mounted on the shaft 102. The rotor 104 is rotatable concomitantly with the shaft 102 about the longitudinal axis LX. The rotor 104 defines an innermost rotor edge 106 and an outermost rotor edge 108 opposite the innermost rotor edge 106. The outermost rotor edge 108 is farther from the center CN (FIG. 3) of the rotor 104 than the innermost rotor edge 106. The innermost rotor edge 106 of the rotor 104 defines a shaft opening 111 sized to receive the shaft 102. The rotor 104 further has an outermost rotor edge 108 opposite the innermost rotor edge 108. The stator 110 is disposed around the outermost rotor edge 108 of the rotor 104. The electric motor 100 includes a stator 110 coupled to the rotor 104. The stator 110 is disposed around the rotor 104 and remains stationary relative to the rotor 104. The electric motor 100 further includes one or more flow splitter 113 at least partially disposed inside a jacket 112 of the shaft 102.

The shaft 102 defines the jacket 112 configured to receive a coolant C (e.g., oil). The jacket 112 is disposed about the longitudinal axis LX to cool the shaft 102. The jacket 112 may have an annular shape to uniformly cool the shaft 102. Further, the jacket 112 is elongated in a first direction X to cool the shaft 102 along its entire length. The first direction X is parallel to the longitudinal axis LX. The jacket 112 may be entirely disposed inside the shaft 102 to effectively cool the shaft 102. The jacket 112 is in direct fluid communication with a coolant source 116. As such, the coolant source 116 supplies the coolant C to the jacket 112. As a result, the coolant C flows directly from the coolant source 116 to the jacket 112. The coolant source 116 and the electric motor 100 collectively define a motor assembly 101.

The rotor 104 defines a plurality of longitudinal channels 114 in fluid communication with the jacket 112. Each longitudinal channel 114 is elongated along the first direction X to cool the rotor 104 along most (or all) of its length. Each longitudinal channel 114 is in fluid communication with the jacket 112 to allow fluid flow between the jacket 112 and longitudinal channels 114. Each longitudinal channel 114 is entirely disposed inside the rotor 104 to effectively cool the rotor 104. The jacket 112 is spaced apart from the longitudinal channels 114 along a second direction Y. The second direction Y is perpendicular to the first direction X.

The electric motor 100 further includes one or more flow splitters 113 each configured to split the flow of the coolant C between the jacket 112 and the longitudinal channels 114. To do so, each of the flow splitters 113 is disposed inside the jacket 112. As a consequence, part of the coolant C (e.g., oil) enters the jacket 112 and continues to flow along the entire length of the jacket 112 and another part of the coolant C enters the longitudinal channels 114 (through the jacket 112) and flows along the entire length of the longitudinal channels 114, thereby allowing cooling of the shaft 102 and the rotor 104. Thus, the flow splitter 113 causes the coolant C (e.g., oil) to flow from the jacket 112 into the longitudinal channels 14 and back into the jacket 112 to minimize the amount of coolant C flowing into the air gap of the electric motor 100, thereby minimizing spin loss and coolant loss. The flow splitters 113 also maximizes the amount of coolant C used to cool the rotor 104. As discussed above, the flow splitters 113 are disposed inside the jacket 112, leaving a clearance that is between 0.05 millimeters and 0.5 millimeters. This clearance range maximizing the amount of coolant C that enters the longitudinal channels 114 while allowing sufficient coolant C to flow through the jacket 112 to efficiently cool the rotor 104 and the shaft 12.

Figure 2:
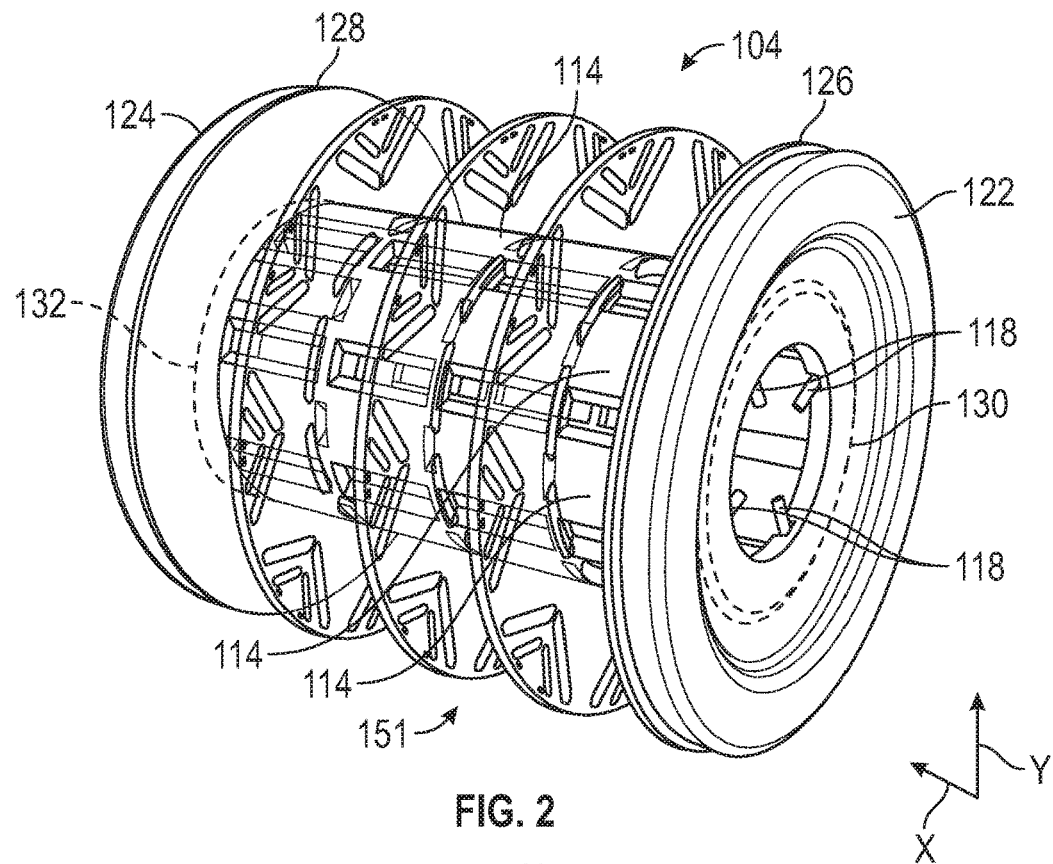
FIG. 2 schematically illustrates perspective view of a rotor of the electric motor of FIG. 1, showing end rings and the rotor jacket of the rotor.

With reference to FIGS. 1 and 2, the electric motor 100 further includes a plurality of inlets 118 each fluidly interconnecting the jacket 112 to the longitudinal channels 114 (FIG. 1). At least one of the inlets 118 is directly connected to one of the longitudinal channels 114 to facilitate flow between the jacket 112 and the longitudinal channels 114. The electric motor 100 may include between four and twelves inlets 118 each with an inlet diameter between three and five millimeters to distribute the coolant C uniformly in the longitudinal channels 114 and enhance the coolant mass dynamic balance. The electric motor 100 further includes a plurality of outlets 120 fluidly interconnecting the jacket 112 to the longitudinal channels 114. The outlets 120 are spaced apart from the inlets 118 along the first direction X to allow the coolant C to cool most of the length of the rotor 104.

With reference to FIG. 2, the electric motor 100 further includes a first end ring 122 and a second end ring 124 opposite the first end ring 122. The rotor 104 includes a first rotor end 126 and a second rotor end 128 opposite to the first rotor end 126. The first rotor end 126 is spaced apart from the second rotor end 128 along the first direction X. The first end ring 122 is attached to the rotor 104 at the first rotor end 126. The second end ring 124 is attached to the rotor 104 at the second rotor end 128. The first end ring 126 defines a first end channel 130, which is one of the interconnection channels 154. The second end ring 124 defines a second end channel 132, which is one of the interconnection channels 154. The first end channel 130 may have an annular shape to facilitate the flow of coolant C around the rotor 104. The first end channel 130 is in fluid communication with the longitudinal channels 114 (FIG. 1). The second end channel 132 may have an annular shape to facilitate the flow of coolant C around the rotor 104. The second end channel 132 is in fluid communication with the longitudinal channels 114 (FIG. 1). The first end channel 130, which is one of the interconnection channels 154, may be directly connected to all of the inlets 118 to facilitate flow between the inlets 118 and the longitudinal channels 114 (FIG. 1). At one of the inlets 118 may be directly connected to one of the longitudinal channels 114 to allow the coolant C to flow from the first end channel 130 to the longitudinal channels 114 through the inlets 118. The second end channel 132 may be directly connected to all of the outlets 120 to facilitate coolant flow between the longitudinal channels 114 (FIG. 1) and the outlets 120. At least one of the outlets 120 may be directly connected to one of the longitudinal channels 114 to allow the coolant C to flow from the longitudinal channels 114 to the second end channel 132 through the outlets 120 (FIG. 1). The electric motor 100 may have between four and twelve outlets 120 each with an outlet diameter between three millimeters and five millimeters to uniformly distribute coolant C in the longitudinal channels 114, thereby enhancing the coolant mass dynamic balance and retain coolant C in the longitudinal channels 114 for an optimized heat transfer performance.

Figure 3:
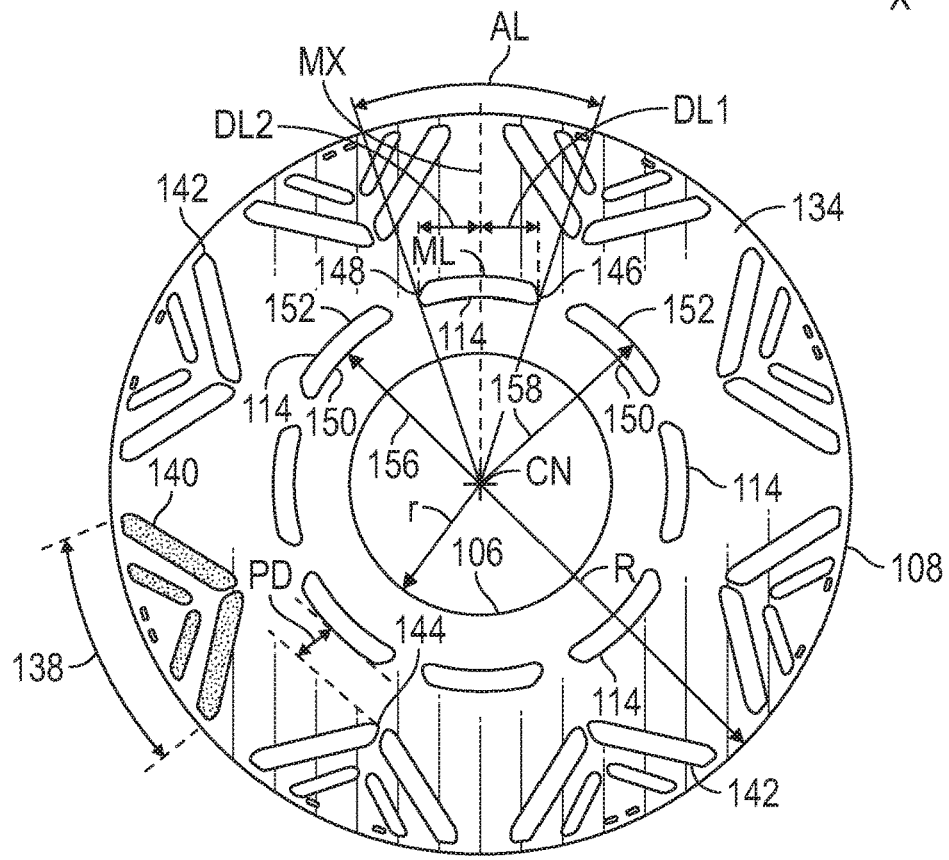
FIG. 3 schematically illustrates a front view of a first lamination of the rotor of FIG. 2.
Figure 4:
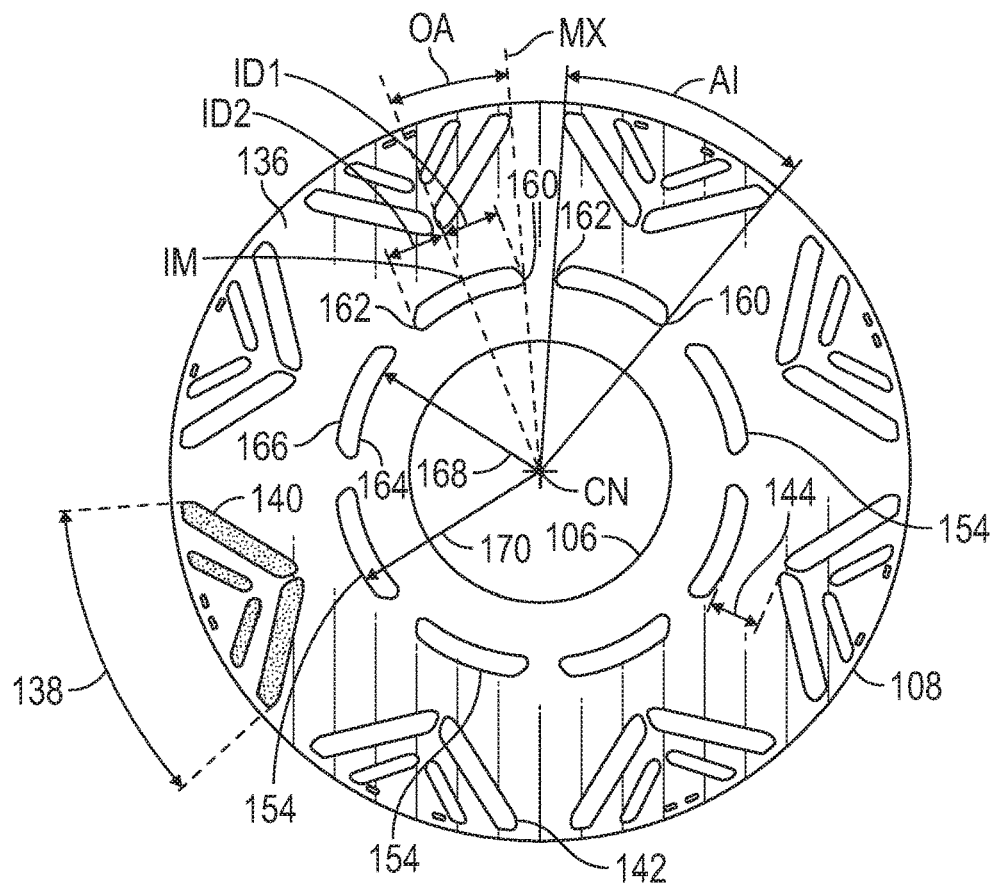
FIG. 4 schematically illustrates a front view of a second lamination of the rotor of FIG. 3.
Figure 5:
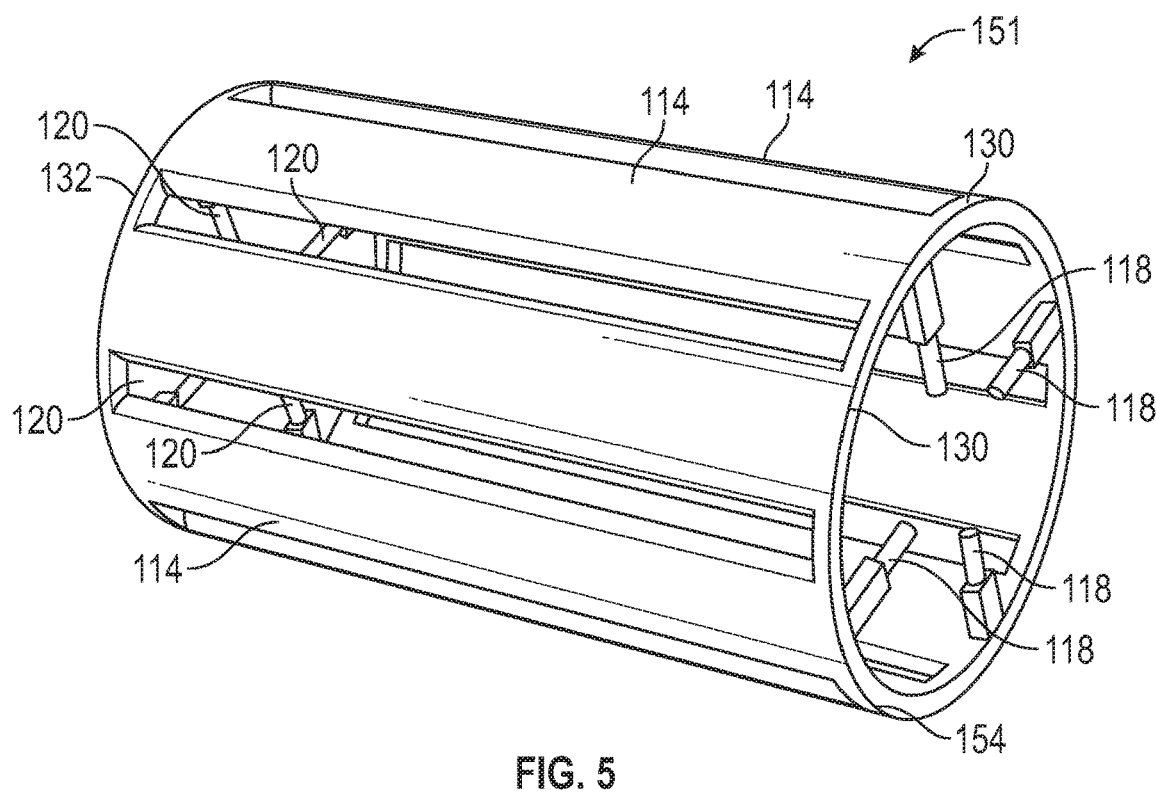
FIG. 5 schematically illustrates a perspective view of a rotor jacket of the rotor of FIG. 2 in accordance with an aspect of the present disclosure.

With reference to FIGS. 3-5, the rotor 104 may be at least partially formed by a plurality of laminations (i.e., first laminations 134 and a second laminations 136). The first laminations 134 stacked together to form the longitudinal channels 114. The electric motor 100 includes a plurality of pole pieces 138. Each pole piece 134 has permanent magnets 140 and permanent magnet slots 142. While the figures show some of the permanent magnets 140 for simplicity, each permanent magnet slot 142 receives a permanent magnet 140. Thus, each permanent magnet slot 142 is sized to receive a permanent magnet 140. Each permanent-magnet slot has an innermost slot point 144. The innermost slot point 144 may be disposed at a location that is closest to the center CN of the rotor 104.

When the first laminations 134 are stacked, the rotor 104 defines the longitudinal channels 114. Each longitudinal channel 114 has a first lateral end 146 and a second lateral end 148 opposite the first lateral end 146. Each longitudinal channel 114 is shaped as an arc extending from the first lateral end 146 to the second lateral end 148. Each longitudinal channel 114 defines a central angle AL. The central angle AL of each longitudinal channel 114 is subtended by the arc extending from the first lateral end 146 to the second lateral end 148. The central angle AL of each longitudinal channel 114 is less than $$\frac{360°}{M} \times 0.95$$

degrees, where M is a number of polar pieces 138, in order to maximize the convective surface area, thereby enhancing cooling. The lower limit of the central angle AL of each longitudinal channel 114 may be determined based on the dimensional requirements and/or restrictions of the electric motor 100. While the depicted embodiment shows eight pole pieces 138, the electric motor 100 may include more or fewer pole pieces 138.

The rotor 104 has an innermost rotor radius r. The innermost rotor radius r (in millimeters) is defined from the center CN of the rotor 104 to the innermost rotor edge 106. Each longitudinal channel 114 defines an innermost longitudinal-channel end 150 and an outermost longitudinal-channel end 152 opposite the innermost longitudinal-channel end 150. The outermost longitudinal-channel end 152 of each longitudinal channel 114 is farther from the center CN of the rotor 104 than the innermost longitudinal-channel end 152 of each longitudinal channel 114. Each longitudinal channel 114 defines an innermost longitudinal-channel radius 156 and an outermost longitudinal-channel radius 158. The innermost longitudinal-channel radius 156 is defined from the center CN of the rotor 104 to the innermost longitudinal-channel end 150. The innermost longitudinal-channel radius 156 (in millimeters) is equal to or greater than r+5 millimeters, where r is the innermost rotor radius in millimeters, in order to optimize coolant mass dynamic balance. The upper limit of the innermost longitudinal-channel radius 156 of each longitudinal channel 114 may be determined based on the dimensional requirements and/or restrictions of the electric motor 100.

The rotor 104 has an outermost rotor radius R. The outermost rotor radius R (in millimeters) is defined from the center CN of the rotor 104 to the outermost rotor edge 108 of the rotor 104. The outermost longitudinal-channel radius 158 is defined from the center CN of the rotor 104 to the outermost longitudinal-channel end 152 of each longitudinal channel 114. The outermost longitudinal-channel radius 158 (in millimeters) is equal to or less than R−10 millimeters, where R is the outermost rotor radius in millimeters, in order to maximize the convective surface area, thereby enhancing cooling. The lower limit of the outermost longitudinal-channel radius 158 may be determined based on the dimensional requirements and/or restrictions of the electric motor 100. Further, the distance PD from the outermost longitudinal-channel end 152 to the innermost slot point 144 is greater than 3 millimeters in order to maximize the convective surface area, thereby enhancing cooling. The upper limit of the distance PD may be determined based on the dimensional requirements and/or restrictions of the electric motor 100. Each longitudinal channel 114 has a longitudinal-channel midpoint ML between the first lateral end 146 and the second lateral end 148. A first longitudinal-channel distance DL1 from the first lateral end 146 to the longitudinal-channel midpoint ML is equal to a second longitudinal-channel distance DL2 from the second lateral end 148 to the longitudinal-channel midpoint ML. The longitudinal-channel midpoint ML is intersected by a midpoint axis MX that extends from the center CN of the rotor 104 to the longitudinal-channel midpoint ML.

With reference to FIGS. 4 and 5, the rotor 104 defines a plurality of interconnection channels 154 formed by the second laminations 136 when stacked together, except for the end channels 130 and 132. The interconnection channels 154 and the longitudinal channels 114 collectively define a rotor jacket 151. Each interconnection channel 154 directly interconnects an adjacent pair of longitudinal channels 114 to direct the coolant C from one of the longitudinal channels 114 to another, adjacent longitudinal channels 114. Each interconnection channels 154 is entirely disposed inside the rotor 104 to effectively cool the rotor 104. Each interconnection channels 154 has an interconnection-channel midpoint IM. Each interconnection channel 154 includes a first side-end 160 and a second side-end 162 opposite the first side-end 160. The first interconnection-channel distance ID1 from the first side-end 160 to the interconnection-channel midpoint IM is equal to a second interconnection-channel distance ID2 from the second side-end 162 to the interconnection-channel midpoint IM. Each interconnection channel 154 is shaped as an arc extending from the first side-end 160 to the second side-end 162. Each interconnection channel 154 is angularly offset from an adjacent longitudinal channel 114 by an offset angle OA. The offset angle OA is defined from the longitudinal-channel midpoint ML of one of the longitudinal channels 114 to the interconnection-channel midpoint IM of the adjacent interconnection channels 154. The offset angle is equal to $$\frac{360°}{M} \times 0.5,$$

where M is the number of polar pieces 138 in order to enhance the coolant mass dynamic balance.

Each interconnection channel 154 defines an innermost interconnection-channel end 164 and an outermost interconnection-channel end 166 opposite the innermost interconnection-channel end 164. The outermost interconnection-channel end 166 of each interconnection channel 154 is farther from the center CN of the rotor 104 than the innermost interconnection-channel end 164 of each interconnection channel 154. Each interconnection channel 154 defines an innermost interconnection-channel radius 168 and an outermost interconnection-channel radius 170. The innermost interconnection-channel radius 168 is defined from the center CN of the rotor 104 to the innermost interconnection-channel end 164. The innermost interconnection-channel radius 164 (in millimeters) is equal to or greater than r+5 millimeters, where r is the innermost rotor radius in millimeters, in order to maximize the convective surface area, decrease the rotor mass, and reduce magnet temperature. The lower limit of the innermost interconnection-channel radius 164 may be determined based on the dimensional requirements and/or restrictions of the electric motor 100.

Each interconnection channel 154 defines an outermost interconnection-channel radius 170. The outermost interconnection-channel radius 170 (in millimeters) is defined from the center CN of the rotor 104 to the outermost interconnection-channel end 166 of each interconnection channel 154. The outermost longitudinal-channel radius 170 is equal to or less than R−10 millimeters, where R is the outermost rotor radius in millimeters, order to maximize the convective surface area, decrease the rotor mass, and reduce magnet temperature. The upper limit of the outermost longitudinal-channel radius 170 may be determined based on the dimensional requirements and/or restrictions of the electric motor 100.

Each interconnection channel 154 is shaped as an arc extending from the first side-end 160 to the second side-end 162. Each interconnection channel 154 has a central angle AI. The central angle AI of each interconnection channel 154 is subtended by the arc extending from the first side-end 160 to the second side-end 162. The central angle AI of each of the plurality of interconnection channels 154 is less than $$\frac{360°}{M} \times 0.95$$

degrees, and M is a number of polar pieces, in order to enhance the coolant mass dynamic balance. The lower limit of the central angle AI of each interconnection channel 154 may be determined based on the dimensional requirements and/or restrictions of the electric motor 100. While the depicted embodiment shows eight pole pieces 138, the electric motor 100 may include more or fewer pole pieces 138. As shown in FIG. 5, the first laminations 134 and second laminations 136 may be arranged to include interconnection channels 154 solely at the ends of the rotor 104.

Figure 6:
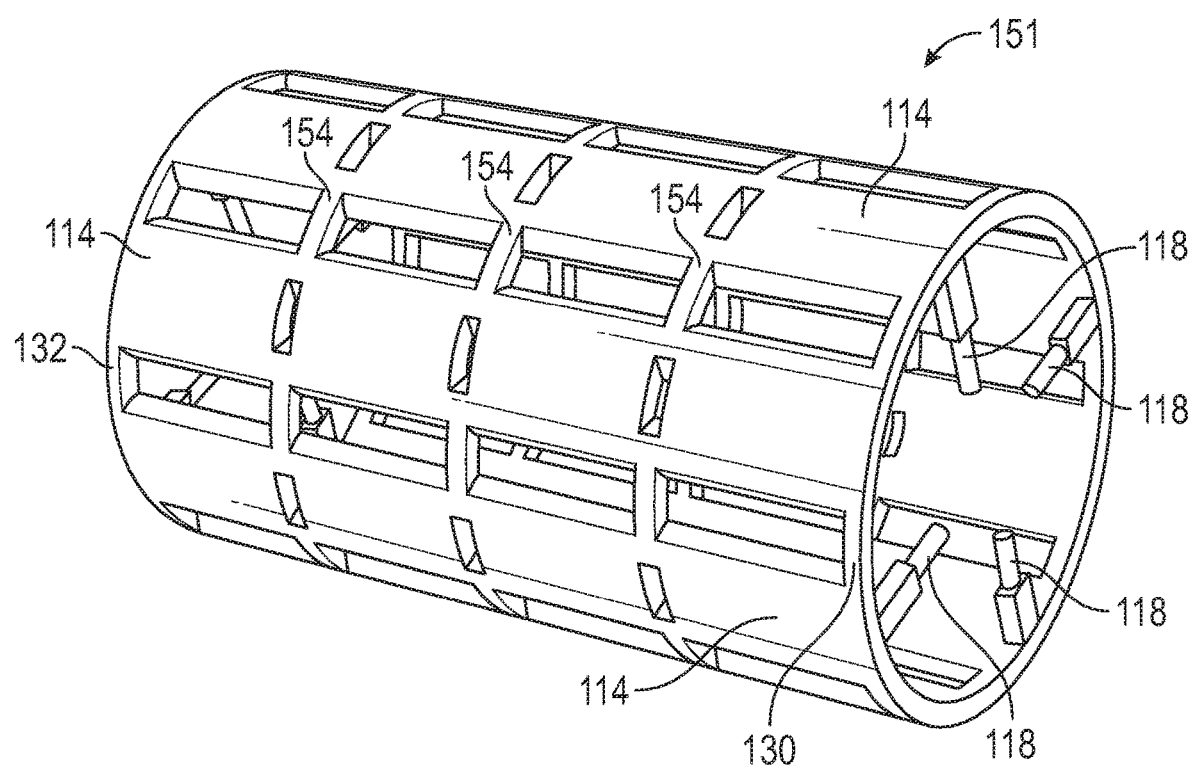
FIG. 6 schematically illustrates a perspective view of a rotor jacket in accordance with another aspect of the present disclosure.

As shown in FIG. 6, the first laminations 134 and second laminations 136 may be arranged to include longitudinal channels 114 that are longer than the interconnection channels 154.

Figure 7:
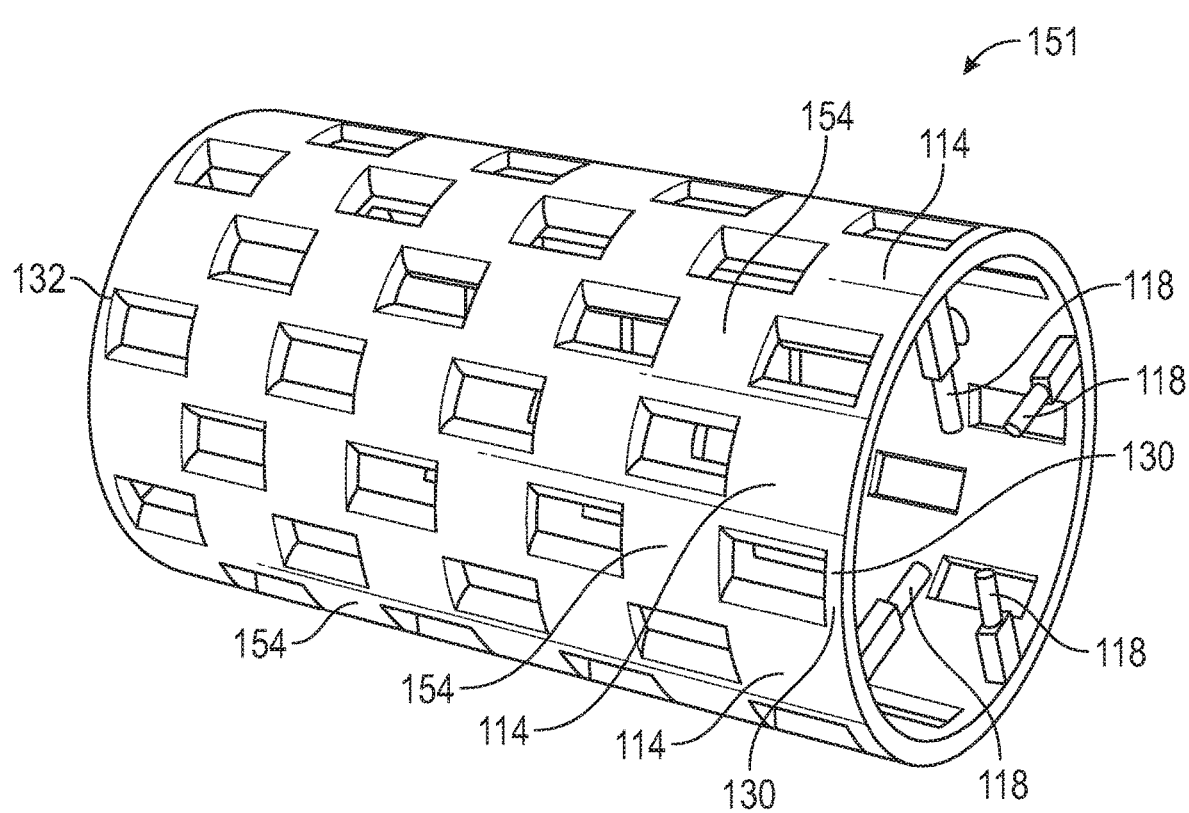
FIG. 7 schematically illustrates a perspective view of a rotor jacket in accordance with another aspect of the present disclosure.

As shown in FIG. 7, the first laminations 134 and second laminations 136 may be arranged to include longitudinal channels 114 that have the same length as the interconnection channels 154

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effed the characteristic was intended to provide.

A plurality of items may he presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refer to selection of one of two or more alternatives and is not intended to limit the selection to only those listed alternatives or to only one of the listed alternatives at a time, unless the context clearly indicates otherwise.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A permanent magnet electric motor, comprising:
   a shaft extending along a longitudinal axis;
   a rotor mounted on the shaft, wherein the rotor is rotatable concomitantly with the shaft about the longitudinal axis, the rotor defines an innermost rotor edge, and the innermost rotor edge is sized to receive the shaft;
   a stator electromagnetically coupled to the rotor, wherein the stator is disposed around the rotor and remains stationary relative to the rotor;
   wherein the shaft defines a jacket configured to receive a coolant, the jacket is disposed about the longitudinal axis, the jacket is elongated in a first direction, and the first direction is parallel to the longitudinal axis;
   wherein the rotor defines a plurality of longitudinal channels, each of the plurality of longitudinal channel is elongated along the first direction, and each of the plurality of longitudinal channels is in fluid communication with the jacket to allow fluid flow between the jacket and the plurality of the longitudinal channels; and
   wherein the rotor defines a plurality of interconnection channels, each of the plurality of interconnection channels directly interconnects an adjacent pair of the plurality of longitudinal channels to direct the coolant from one of the plurality of longitudinal channels to another one of the plurality of the longitudinal channels, the jacket is entirely disposed inside the shaft, each of the plurality of longitudinal channels is entirely disposed inside the rotor, and each of the plurality of interconnection channels is entirely disposed inside the rotor, the permanent motor further includes a plurality of flow splitters located in the jacket of the shaft to guide the coolant into the jacket of the shaft, into the longitudinal channels of the rotor, and then back the jacket of the shaft.

2. The permanent magnet electric motor of claim 1, further comprising a first end ring and a second end ring opposite the first end ring, wherein the rotor includes a first rotor end and a second rotor end opposite to the first rotor end, the first rotor end is spaced apart from the second rotor end along the first direction, the first end ring is attached to the rotor at the first rotor end, the second end ring is attached to the rotor at the second rotor end, the first end ring defines a first end channel, the second end ring defines a second end channel, the first end channel has an annular shape, the first end channel is in fluid communication with the plurality of longitudinal channels, the second end channel has an annular shape, and the second end channel is in fluid communication with the plurality of longitudinal channels.

3. The permanent magnet electric motor of claim 2, further comprising a plurality of pole pieces, each of the plurality of longitudinal channels has a first lateral end and a second lateral end opposite the first lateral end, each of the plurality of longitudinal channels is shaped as an arc extending from the first lateral end to the second lateral end, each of the plurality of longitudinal channels has a central angle, the central angle of each of the plurality of longitudinal channels is subtended by the arc extending from the first lateral end to the second lateral end, and the central angle of each of the plurality of longitudinal channels is less than $$\frac{360°}{M} \times 0.95$$

degrees, and M is a number of polar pieces.

4. The permanent magnet electric motor of claim 3, wherein the rotor has a center, the rotor has an innermost rotor radius, the innermost rotor radius is defined from the center of the rotor to the innermost rotor edge, each of the plurality of longitudinal channels defines an innermost longitudinal-channel end and an outermost longitudinal-channel end opposite the innermost longitudinal-channel end, the outermost longitudinal-channel end of each of the plurality of longitudinal channels is farther from the center of the rotor than the innermost longitudinal-channel end of each of the plurality of longitudinal channels, each of the plurality of longitudinal channels defines an innermost longitudinal-channel radius and an outermost longitudinal-channel radius, the innermost longitudinal-channel radius is defined from the center of the rotor to the innermost longitudinal-channel end, the innermost longitudinal-channel radius is equal to or greater than:
   r+5 millimeters; and
   where r is the innermost rotor radius in millimeters.

5. The permanent magnet electric motor of claim 4, wherein the rotor defines an outermost rotor edge, the outermost rotor edge is opposite to the innermost rotor edge, the outermost rotor edge is farther from the center of the rotor than the innermost rotor edge, the rotor has an outermost rotor radius, the outermost rotor radius is defined from the center of the rotor to the outermost rotor edge of the rotor, each of the plurality of longitudinal channels defines an outermost longitudinal-channel radius, the outermost longitudinal-channel radius is defined from the center of the rotor to the outermost longitudinal-channel end of each of the plurality of longitudinal channels, and the outermost longitudinal-channel radius is equal to or less than:

R−10 millimeters; and where R is the outermost rotor radius in millimeters.

6. The permanent magnet electric motor of claim 5, wherein each of the plurality of longitudinal channels has a longitudinal-channel midpoint between the first lateral end and the second lateral end, a first longitudinal-channel distance from the first lateral end to the longitudinal-channel midpoint is equal to a second longitudinal-channel distance from the second lateral end to the longitudinal-channel midpoint, each of the plurality of interconnection channels has an interconnection-channel midpoint, each of the plurality of interconnection channels includes a first side-end and a second side-end opposite the first side-end, a first interconnection-channel distance from the first side-end to the interconnection-channel midpoint is equal to a second interconnection-channel distance from the second side-end to the interconnection-channel midpoint, each of the plurality of interconnection channels is shaped as an arc extending from the first side-end to the second side-end, each of the plurality of interconnection channels is angularly offset from an adjacent one of the plurality of longitudinal channels by an offset angle, the offset angle is defined from the longitudinal-channel midpoint of one of the plurality of longitudinal channels to the interconnection-channel midpoint of the adjacent one of the plurality of interconnection channels, and the offset angle is equal to:

$$\frac{360°}{M} \times 0.95$$

where M is the number of polar pieces.

7. The permanent magnet electric motor of claim 6, wherein the rotor defines a plurality of permanent-magnet slots, each of the plurality of permanent-magnet slots is sized to receive a permanent magnet, each of the plurality of permanent-magnet slots has an innermost slot point, the innermost slot point is disposed at a location of each of the permanent-magnet slot that is closest to the center of the rotor, and a distance from the outermost longitudinal-channel end to the innermost slot point is greater than 3 millimeters.

8. The permanent magnet electric motor of claim 7, wherein each of the plurality of interconnection channels defines an innermost interconnection-channel end and an outermost interconnection-channel end that is opposite the innermost interconnection-channel end, the outermost interconnection-channel end of each of the plurality of interconnection channels is farther from the center of the rotor than the innermost interconnection-channel end of each of the plurality of interconnection channels, each of the plurality of interconnection channels defines an innermost interconnection-channel radius and an outermost interconnection-channel radius, the innermost interconnection-channel radius is defined from the center of the rotor to the innermost interconnection-channel end, the innermost interconnection-channel radius is equal to or greater than:

r+5 millimeters; and where r is the innermost rotor radius in millimeters.

9. The permanent magnet electric motor of claim 8, wherein each of the plurality of interconnection channels defines an outermost interconnection-channel radius, the outermost interconnection-channel radius is defined from the center of the rotor to the outermost interconnection-channel end of each of the plurality of interconnection channels, and the outermost longitudinal-channel radius is equal to or less than:

R−10 millimeters; and where R is the outermost rotor radius in millimeters.

10. The permanent magnet electric motor of claim 9, wherein each of the plurality of interconnection channels is shaped as an arc extending from the first side-end to the second side-end, each of the plurality of interconnection channels has a central angle, the central angle of each of the plurality of interconnection channels is subtended by the arc extending from the first side-end to the second side-end, and the central angle of each of the plurality of interconnection channels is less than $$\frac{360°}{M} \times 0.95$$

degrees, and M is a number of polar pieces.

11. The permanent magnet electric motor of claim 10, further comprising a plurality of inlets fluidly interconnecting the jacket of the shaft to the plurality of longitudinal channels of the rotor, the first end channel is directly connected to all of the plurality of inlets, at least one of the plurality of inlets is directly connected to one of the plurality of longitudinal channels to allow the coolant to flow from the first end channel to the plurality of longitudinal channels through the plurality of inlets.

12. The permanent magnet electric motor of claim 11, wherein the plurality of inlets includes between four and twelve inlets, and each of the plurality of inlets has an inlet diameter, and the inlet diameter is between three and five millimeters.

13. The permanent magnet electric motor of claim 12, further comprising a plurality of outlets fluidly interconnecting the jacket of the shaft to the plurality of longitudinal channels of the rotor, the plurality of outlets is spaced apart from the plurality of inlets along the first direction, the second end channel is directly connected to all of the plurality of outlets, at least one of the plurality of outlets is directly connected to one of the plurality of longitudinal channels to allow the coolant to flow from the longitudinal channels to the second end channel through the plurality of outlets.

14. A permanent magnet electric motor, comprising:
a shaft extending along a longitudinal axis;
a rotor mounted on the shaft, wherein the rotor is rotatable concomitantly with the shaft about the longitudinal axis, the rotor defines an innermost rotor edge, and the innermost rotor edge is sized to receive the shaft;
a stator electromagnetically coupled to the rotor, wherein stator is disposed around the rotor and remains stationary relative to the rotor;
wherein the shaft defines a jacket configured to receive a coolant, the jacket is disposed about the longitudinal axis, the jacket is elongated in a first direction, and the first direction is parallel to the longitudinal axis; and
wherein the rotor defines a plurality of longitudinal channels, each of the plurality of longitudinal channel is elongated along the first direction, and each of the plurality of longitudinal channels is in fluid communication with the jacket to allow fluid flow between the jacket and the plurality of the longitudinal channels; and wherein the rotor defines a plurality of interconnection channels, each of the plurality of interconnection channels directly interconnects an adjacent pair of the plurality of longitudinal channels to direct the coolant from one of the plurality of longitudinal channels to another one of the plurality of the longitudinal channels, the jacket is entirely disposed inside the shaft, each of the plurality of longitudinal channels is entirely disposed inside the rotor, and each of the plurality of interconnection channels is entirely disposed inside the rotor; and wherein the permanent magnet electric motor includes a plurality of pole pieces, each of the plurality of longitudinal channels has a first lateral end and a second lateral end opposite the first lateral end, each of the plurality of longitudinal channels is shaped as an arc extending from the first lateral end to the second lateral end, each of the plurality of longitudinal channels has a central angle, the central angle of each of the plurality of longitudinal channels is subtended by the arc extending from the first lateral end to the second lateral end, and the central angle of each of the plurality of longitudinal channels is less than $$\frac{360°}{M} \times 0.95$$

degrees, and M is a number of polar pieces.

15. The permanent magnet electric motor of claim 14, wherein each of the plurality of longitudinal channels has a longitudinal-channel midpoint between the first lateral end and the second lateral end, a first longitudinal-channel distance from the first lateral end to the longitudinal-channel midpoint is equal to a second longitudinal-channel distance from the second lateral end to the longitudinal-channel midpoint, each of the plurality of interconnection channels has an interconnection-channel midpoint, each of the plurality of interconnection channels includes a first side-end and a second side-end opposite the first side-end, a first interconnection-channel distance from the first side-end to the interconnection-channel midpoint is equal to a second interconnection-channel distance from the second side-end to the interconnection-channel midpoint, each of the plurality of interconnection channels is shaped as an arc extending from the first side-end to the second side-end, each of the plurality of interconnection channels is angularly offset from an adjacent one of the plurality of longitudinal channels by an offset angle, the offset angle is defined from the longitudinal-channel midpoint of one of the plurality of longitudinal channels to the interconnection-channel midpoint of the adjacent one of the plurality of interconnection channels, and the offset angle is equal to:

$$\frac{360°}{M} \times 0.5$$

where M is the number of polar pieces.

16. The permanent magnet electric motor of claim 15, wherein each of the plurality of interconnection channels is shaped as an arc extending from the first side-end to the second side-end, each of the plurality of interconnection channels has a central angle, the central angle of each of the plurality of interconnection channels is subtended by the arc extending from the first side-end to the second side-end, and the central angle of each of the plurality of interconnection channels is less than $$\frac{360°}{M} \times 0.95$$

degrees, and M is a number of polar pieces.

17. The permanent magnet electric motor of claim 16, wherein the rotor has a center, the rotor has an innermost rotor radius, the innermost rotor radius is defined from the center of the rotor to the innermost rotor edge, each of the plurality of longitudinal channels defines an innermost longitudinal-channel end and an outermost longitudinal-channel end opposite the innermost longitudinal-channel end, the outermost longitudinal-channel end of each of the plurality of longitudinal channels is farther from the center of the rotor than the innermost longitudinal-channel end of each of the plurality of longitudinal channels, each of the plurality of longitudinal channels defines an innermost longitudinal-channel radius and an outermost longitudinal-channel radius, the innermost longitudinal-channel radius is defined from the center of the rotor to the innermost longitudinal-channel end, the innermost longitudinal-channel radius is equal to or greater than:

r+5 millimeters; and where r is the innermost rotor radius in millimeters.

18. The permanent magnet electric motor of claim 17, wherein each of the plurality of interconnection channels defines an innermost interconnection-channel end and an outermost interconnection-channel end that is opposite the innermost interconnection-channel end, the outermost interconnection-channel end of each of the plurality of interconnection channels is farther from the center of the rotor than the innermost interconnection-channel end of each of the plurality of interconnection channels, the rotor defines an outermost rotor edge, the outermost rotor edge is opposite to the innermost rotor edge, the outermost rotor edge is farther from the center of the rotor than the innermost rotor edge, the rotor has an outermost rotor radius, the outermost rotor radius is defined from the center of the rotor to the outermost rotor edge of the rotor, each of the plurality of interconnection channels defines an outermost interconnection-channel radius, the outermost interconnection-channel radius is defined from the center of the rotor to the outermost interconnection-channel end of each of the plurality of interconnection channels, and the outermost longitudinal-channel radius is equal to or less than:

R−10 millimeters; and where R is the outermost rotor radius in millimeters.

19. The permanent magnet electric motor of claim 18, wherein the rotor defines a plurality of permanent-magnet slots, each of the plurality of permanent-magnet slots is sized to receive a permanent magnet, each of the plurality of permanent-magnet slots has an innermost slot point, the innermost slot point is disposed at a location of each of the permanent-magnet slot that is closest to the center of the rotor, and a distance from the outermost longitudinal-channel end to the innermost slot point is greater than 3 millimeters.

* * * * *